United States Patent

Girard et al.

[15] 3,640,125
[45] Feb. 8, 1972

[54] WATER ABSORPTION TEST METHOD

[72] Inventors: Christian F. Girard, Ottawa, Ontario; Gerald J. Derouin, Hull, Quebec, both of Canada

[73] Assignee: Canadian International Paper Company, Montreal, Quebec, Canada

[22] Filed: Nov. 17, 1969

[21] Appl. No.: 877,201

[52] U.S. Cl. ................................................................73/73
[51] Int. Cl. ...........................................................G01n 33/34
[58] Field of Search...........................73/29, 38, 73, 74, 159

[56] References Cited

UNITED STATES PATENTS

| | | | |
|---|---|---|---|
| 1,642,577 | 9/1927 | Carson | 73/73 X |
| 2,613,531 | 10/1952 | Bacon | 73/38 |
| 3,248,930 | 5/1966 | Speegle | 73/38 |
| 1,660,024 | 2/1928 | Abrams | 73/38 |
| 2,575,169 | 11/1951 | Green | 73/73 |
| 3,201,871 | 8/1965 | Ragan | 73/73 X |

Primary Examiner—Richard C. Queisser
Assistant Examiner—C. E. Snee, III
Attorney—R. G. McClenahan and Eli J. McKhool

[57] ABSTRACT

Method for testing the water absorption characteristics of building board materials, for example, Masonite, in which the rough side of the board is submerged in water and the smooth side subjected to a predetermined vacuum for a predetermined interval of time. The time and vacuum parameters of the method are calculated to achieve as closely as possible the same water absorption and thickness results as are obtained with the standard 24-hour test method.

3 Claims, 5 Drawing Figures

3,640,125

WATER ABSORPTION TEST METHOD

BACKGROUND OF THE INVENTION

This invention relates to water absorption testing of building boards in general and more particularly to a method and apparatus for testing the water absorption characteristics of hardboard materials, such as Masonite, which are made by compressing shredded wood chips together often with a binder at high temperatures.

The manufacture of hardboard includes treating the shredded chips with sizing which is added to the water in which these chips are mixed to form a pulp. The sizing serves, among other things, to control the water absorption characteristics of the finished product. Normally it takes several hours from the time the sizing is added to the mixture until the board is completed. Control of the amount or composition of the sizing added to the mixture is important in order that the water absorption characteristics of the finished product be kept within certain specified limits set according to which of the various grades of board is being produced. To keep these characteristics within these limits, it is necessary to test the finished product and then apply control measures whenever results show absorption outside the limits for the particular grade of board produced. The 24-hour immersion test method, which is known and used in the industry, is quite reliable but takes too long to carry out. A shorter method which gives results which correlate well with those of the 24-hour test method is needed. It is therefore an object of this invention to provide such a method.

BRIEF SUMMARY OF THE INVENTION

The method of the invention comprises the steps of weighing and calipering a board test sample, thereafter submerging one side of the sample in water at room temperature and then during such submersion exposing the opposite side of the sample to a predetermined vacuum for a predetermined interval and thereafter quickly releasing the vacuum, removing sample from the water, wiping it off and finally reweighing and recalipering it to determine the amount of water absorbed and the amount the thickness of the sample has increased.

One of the advantages of this method is that using a vacuum tends to deaerate the board and prevent bubbles from forming in it, as will occur if the water on the submerged side of the board is put under pressure. This technique is one of the factors which enables the test method to accurately predict in a short period of time what the results of the longer 24-hour immersion test would be if it were performed on the board. Similar results have not been obtained when an attempt has been made to pressure the water into and through the board.

Hardboard is made with a smooth and a rough side and in carrying out the test, the rough side is submerged face up in the water because it is more absorbent than the smooth side which is more water resistant. The board is preferably submerged in clean water at temperatures ranging from 70° to 90° F. A vacuum of from about 1 to 10 inches of Hg is preferably applied to the board for periods of from about 1 to 10 minutes, the precise vacuum and time interval depending upon the grade of hardboard being tested. A vacuum of about 5 in. Hg for about 5 minutes is preferred, because on the average this combination gives the best results with all of the various grades hardboard. Similar tests on other types of building boards such as particle board, plywood or insulating board are the same but the times and vacuums are different. All of these boards have the characteristic that they absorb water slowly.

DETAILED DESCRIPTION OF THE INVENTION

Figure 1:
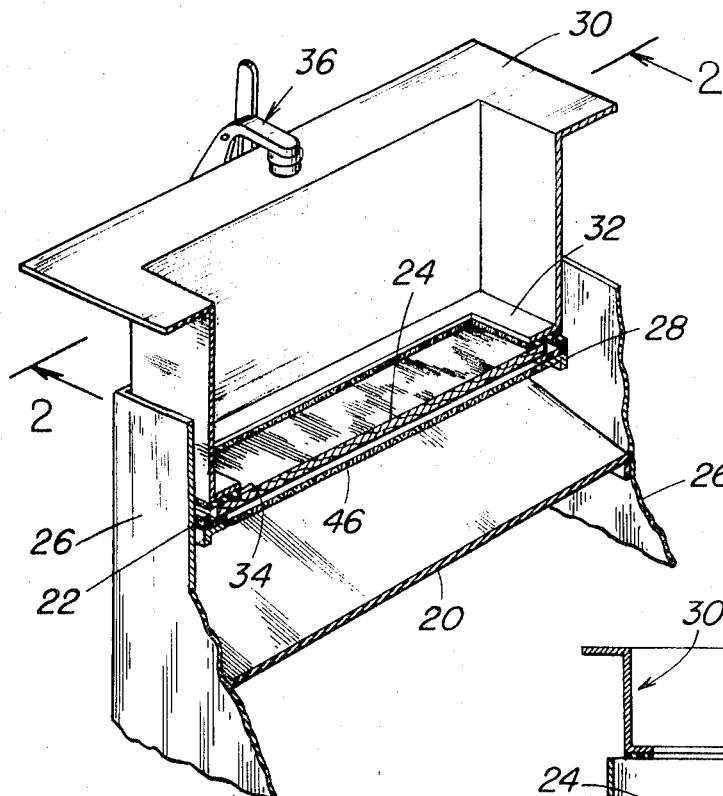
FIG. 1 shows a perspective view partially in cross section of a portion of a preferred embodiment of the apparatus for performing the method.

Referring now to FIGS. 1, 2, 3, and 5 the preferred embodiment of the apparatus according to the invention includes a stand 10 with casters 12 to enable the stand to be rolled or moved easily. Mounted on top of the stand is a cabinet 14 which contains two vacuum chambers, a reserve chamber 16 and an operating chamber 18 which is separated from the reserve chamber by an air- and watertight baffle 20. The bottom of chamber 16 is also airtight and is formed by a plate 21. The upper end of chamber 18 is open but adjacent this end the chamber walls are provided with a bottom gasket 22 on which the smooth side of the test board sample 24 is placed when getting ready to perform the inventive method. Gasket 22 fits in an air- and watertight manner against the walls 26 of chamber 18 and against the upper surface of angle iron 28 which supports the gasket in the chamber. Iron 28 in turn is rigidly mounted against walls 26 around the periphery of the chamber.

Above board sample 24 lies a frame 30 into which the water is poured when the test begins. The frame is slightly smaller in length and width than operating chamber 18 so it fits easily between the walls of chamber 18. The bottom lip 32 of the frame has a gasket 34 cemented to it to prevent water from leaking past. The gasket rests on the edges of the upper surface of the test sample 24 when the frame is clamped in place. Several releasable clamps 36 are mounted on the outside of the operating chamber walls in appropriate relationship to each other to hold the frame in place during the test and to provide a tight seal between gaskets 22 and 34 and the sample 24 so water will not leak past it into chamber 18.

Figure 2:
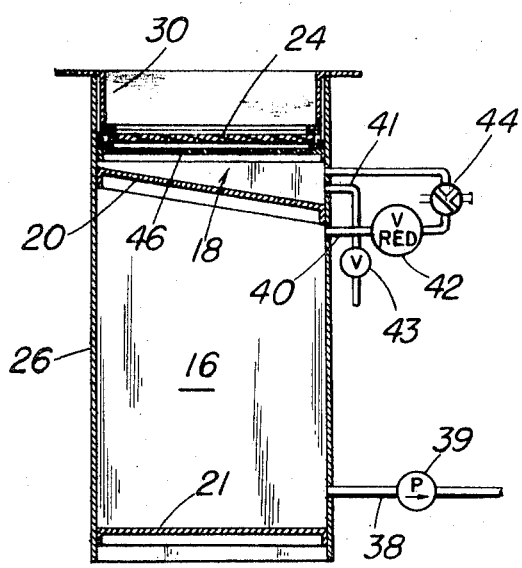
FIG. 2 shows a cross section view of the embodiment of FIG. 1 taken on line 2—2 of that figure with associated valves and piping shown schematically.

The stand may be constructed of angle irons (1 in. × 1 in. × 1/4 in.), bolts (one-fourth inch dia., one-half inch long) and end and side cover plates (one-sixteenth inch thick) preferably formed of stainless steel and supported with 2 in. rubber casters and a mounting plate 37 on which to place the vacuum pump shown schematically at 39 in FIG. 2.

Cabinet 14 is preferably also formed of stainless steel (three-sixteenth inches) angle irons and plates and is of all welded construction to make it airtight. Reserve chamber 16 has a conduit 38 mounted through one wall adjacent its bottom which is connected to pump 39. It also has a second conduit 40 mounted through an upper portion of the same wall which connects the chamber with operating chamber 18. Mounted in conduit 40 adjacent the reserve chamber 16 is a reducing valve 42 which controls the amount of vacuum delivered to the operating chamber. Between valve 42 and the operating chamber is a three-way valve 44 adapted to selectively connect the output end of the reducing valve either directly to the operating chamber 18 or to connect chamber 18 to the atmosphere. A second conduit 41 exists at the bottom of chamber 18 and leads to a drain valve 43 to drain off the water at the end of each test.

Figure 3:
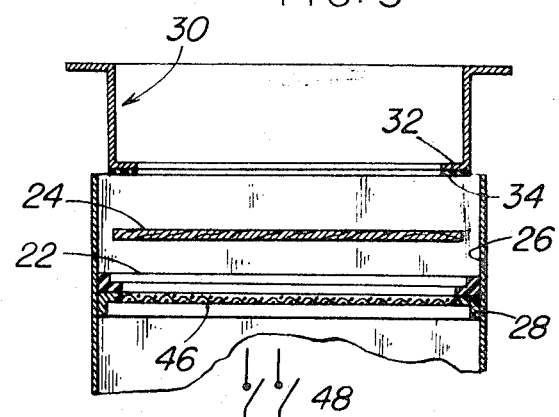
FIG. 3 is an exploded broken cross-sectional view of a portion of the embodiment of FIG. 1

The gaskets 22 and 34 are preferably conventional closed cell neoprene foam rubber material such as is available from the Beattie Foam Rubber Co., in Ottawa, Canada and can be glued with Devcon Rubber, a waterproof adhesive available from Devcon Canada Limited. Clamps 44 are preferably flanged base miniature vertical toggle clamps such as are available from the Detroit Stamping Co. Though a coarse wire screen 46 is shown in FIGS. 1 and 3 attached to angle iron 28 for supporting the test sample when it deflects downwardly as a vacuum is applied, such a screen is normally not necessary.

Figure 4:
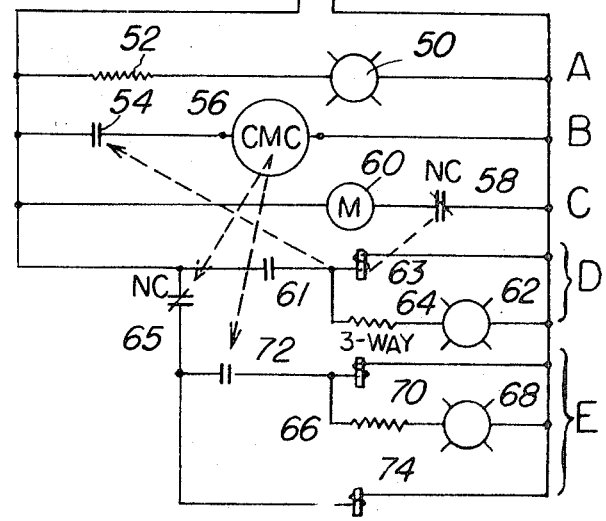
FIG. 4 is a schematic wiring diagram of the electrical circuitry for the embodiment of FIG. 1.
Figure 5:
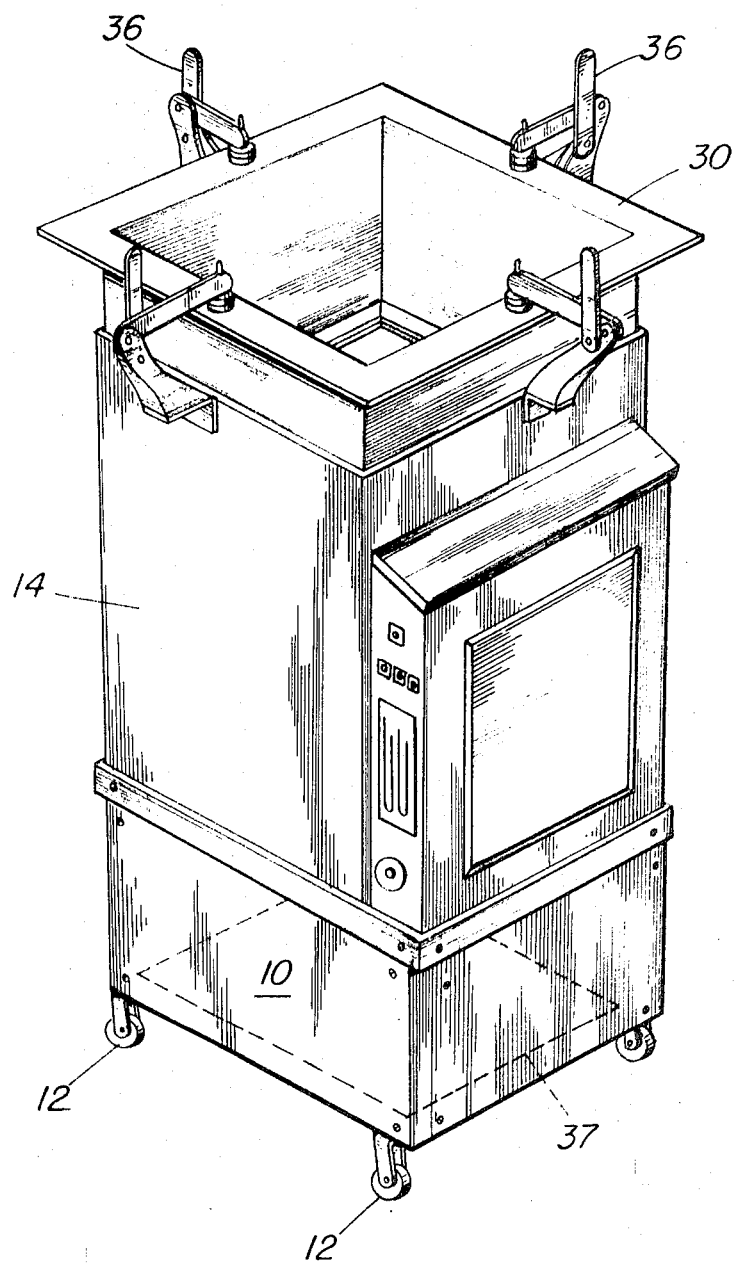
FIG. 5 is a perspective view of the exterior of the preferred embodiment of the apparatus according to the invention.

Operation of the inventive apparatus may be controlled automatically by the electrical circuit shown in FIG. 4 which includes a double-pole single-throw on/off switch 48 connecting the remainder of the circuit to a 115-volt AC 60-cycle power source. The remainder of the circuit includes 5 network branches in parallel. Branch A is simply a pilot light 50 in series with a resister 52 to show whether the power is on or off. Branch B includes a normally open switch 54 in series with an adjustable motor-driven program timer or contact-making clock 56 (CMC) adapted to close at least two separate 115-volt circuits. Branch C includes a normally closed switch 58 in series with vacuum pump motor 60. Branch D includes a normally open switch 61 in series with a network including a solenoid 63 in parallel with a pilot light 62 in series with a resistor 64. Branch E includes two parallel networks in series with a normally closed switch 65 which is operated by a timer 56. One of these networks comprises the other circuit controlled by timer 56 and includes a switch 72 in series with a subnetwork comprising a three-way solenoid 66 in parallel with a pilot light 68 in series with a resistor 70. The other network in branch comprises a two-way solenoid 74 in series with switch 65.

In operation as soon as the power is turned on pilot light 50 becomes illuminated, vacuum motor 60 starts up and solenoid 74 operates to shut drain valve 43. As soon as the desired vacuum is reached in the reserve chamber switch 61 closes energizing solenoid 63. Operation of this solenoid shuts off motor 60 by opening switch 58 and energizes timer 56 by closing switch 54. Approximately 5 seconds after the timer becomes energized it closes switch 72 thereby energizing 3 way solenoid 66 which operates valve 44 to fill the operating chamber with a vacuum through reducing valve 42. After 5 minutes or whatever other period is desired, timer 56 opens normally closed switch 65 by deenergizing solenoid 74 thus to open the drain valve 43 and deenergizing solenoid 66 to move valve 44 to its second position so as to destroy the vacuum and fill the operating chamber with air from the surrounding room. This completes the cycle.

It should be realized that vacuum switch 61 can be set to maintain different levels of vacuum in reserve chamber 16. It should also be obvious that though vacuum switch 61 turns vacuum pump 60 on and off as needed to maintain the vacuum in chamber 16 the movement of solenoid 63 does not affect the condition of switch 54 once it has been initially closed. Pilot lights 50, 62 and 68 are preferably 2.8-volt elements and resistors 52, 64 and 70 1,750-ohm, 10-watt resistors. Pilot lights 62 and 68 are energized only when their respective solenoids are energized.

In terms of testing the board sample, once it has been fitted between the top and the bottom gaskets of the tester and frame 30 has been clamped in position, water is poured into the frame preferably to a depth of between 1 and 2 inches and switch 48 is closed. This instantly closes drain valve 43 and starts vacuum pump 39 which runs until the vacuum of about 5 inch Hg is reached. At this point the timer 56 starts and 5 seconds later valve 44 operates to draw chamber 18 down to a vacuum of about 3 in. of Hg through reducing valve 42.

It is important that the board sample be covered with water before switching on the apparatus because otherwise the applied vacuum could not initially such air out of the pores of the sample which must be done before any water can penetrate it. Five minutes after the vacuum is applied to the sample timer 56 reverses the operation of solenoid 66 and reconnects operating chamber 18 to the atmosphere and simultaneously deenergizes solenoid 74 to open the drain valve 43 to drain out the water which drops into the operating chamber as frame 30 and board test sample 24 are removed. If a test sample is well sized no water will be sucked completely through the board during the test period though some water may be pulled through if board is either porous or poorly sized. In any case, the inventive method is not concerned with the permeability of the board but rather with the weight of the water picked up by it during the test and the amount the thickness of the board increases.

It should be noted that the test results of this accelerated method correlate well with those of the 24-hour method on various different types of building boards. Generally, these results have been found to be within 5 percentage points of each other using 12 in. by 12 in. samples of a given type of board cut from a single panel.

The embodiments of the invention in which an exclusive property or privilege is claimed are defined as follows:

1. An accelerated method of testing the water absorption characteristics of hardboard sheet materials having a rough face on one side and a smooth face on the other, said method giving results which correlate to within about ±5 percent with the results of the known 24-hour immersion test method on the same materials, said accelerated method comprising the steps of weighing a test board sample of said material, submerging the rough face of said sample in clean water at a temperature of between about 70° and 90° F., thereafter exposing the smooth face of the sample to a vacuum of between about 1 to 10 in. Hg for an interval of between about 1 and 10 minutes, followed by quickly releasing the vacuum and removing the water from adjacent the rough faces of the sample and thereafter reweighing the sample.

2. A method according to claim 1 wherein the smooth face of the test sample is subjected to a vacuum of about 3 in. Hg for an interval of about 5 minutes.

3. A method according to claim 1 wherein the thickness of said test sample is measured before its rough face is submerged in water and measured after that face is removed from the water.

* * * * *